United States Patent [19]

Thornton et al.

[11] Patent Number: 4,701,197
[45] Date of Patent: Oct. 20, 1987

[54] MOLDED PANEL FILTER

[75] Inventors: Donald I. Thornton, Warwick; Clarke A. Rodman, East Providence, both of R.I.

[73] Assignee: Allied Corp., Morristown, N.J.

[21] Appl. No.: 916,270

[22] Filed: Oct. 7, 1986

[51] Int. Cl.$^4$ ............................................. B01D 46/00
[52] U.S. Cl. ..................................... 55/487; 55/521; 55/524; 210/491; 210/493.5; 210/508
[58] Field of Search ................. 55/486, 487, 498, 521, 55/524, 528; 210/489, 490–492, 493.1, 493.5, 508

[56] References Cited

U.S. PATENT DOCUMENTS

| 2,521,984 | 9/1950 | Lang | 55/486 |
| 2,888,095 | 5/1959 | Perrini et al. | 55/487 |
| 2,928,765 | 3/1960 | Kurjan | 55/486 |
| 3,384,241 | 5/1968 | Nostrand | 55/487 |
| 3,400,520 | 9/1968 | Sakurai | 55/487 |
| 3,552,103 | 1/1971 | Smith | 55/486 |
| 3,681,898 | 8/1972 | Hopkins et al. | 55/487 |
| 4,164,400 | 8/1979 | Wald | 55/487 |
| 4,600,420 | 7/1986 | Wydeven | 55/486 |
| 4,629,474 | 12/1986 | Thornton | 210/491 |
| 4,636,231 | 1/1987 | Thornton et al. | 55/486 |

FOREIGN PATENT DOCUMENTS

| 2137309 | 2/1973 | Fed. Rep. of Germany | 55/521 |
| 124518 | 9/1980 | Japan | 55/521 |
| 900450 | 7/1962 | United Kingdom | 55/486 |

*Primary Examiner*—Bernard Nozick
*Attorney, Agent, or Firm*—Ken C. Decker; William N. Antonis

[57] ABSTRACT

A fluid filter element comprises a first filtering medium and a second filtering medium. The first filtering medium includes a nonwoven batt having a marginal edge portion circumscribing the main body portion of the batt in which the fibers are stiffened to provide a support and sealing structure. The second filtering medium includes a nonwoven batt which has been welded into a convoluted drape and which has a circumferential edge portion which provides a supported and sealing structure. The circumferential edge portion is sealed to the marginal edge portion when the fluid filter element is assembled.

10 Claims, 4 Drawing Figures

MOLDED PANEL FILTER

This invention relates to a molded panel fluid filter for the air induction sysstem of an internal combustion engine.

Reference is made to copending U.S. Patent Application No. 765,782 now U.S. Pat. No. 4,661,132 and Ser. No. 765,783, now U.S. Pat. No. 4,636,231 both of which were filed on Aug. 15, 1985 and which are owned by the Assignee of the present invention. The disclosures of these prior applications are incorporated herein by reference.

Existing panel filters for air cleaners used in the air induction system of an internal combustion engine usually consist of water laid pleated medium. The medium is supported by a screen and carrys a urethane or plastisol sealing flange. Accordingly, filters of this type require several parts and a substantial amount of labor for their manufacture. The molded panel filter disclosed herein differs from such prior art filters in that the entire filter assembly may be manufactured and assembled by automated processes, thereby substantially reducing the labor required. The filter design disclosed herein also requires substantially fewer parts than the prior art filters.

The present invention proposes a panel fluid filter of two different members. One of the members is molded from an air laid batt-like material to provide a convoluted design of substantially parallel pleats. The other filter member is an open, batt-like material which permits fluid to pass therethrough with very little restriction. Both of the members are circumscribed by substantially fluid impermeable stiffened marginal edge portions that provide a support and sealing structure for the members. These marginal edge portions are then secured together when the filter is assembled. The open, batt-like prefilter material is especially adapted for capturing fine particles, and the fiberous network thereof is also effective in reducing the momentum of heavier particles so that they are more easily captured by the convoluted filter member. Both filters include either thermoplastic material or thermoplastic fibers which are softened when the portions are heated and molded in a press, as discussed extensively in the aforementioned prior applications. As taught in the prior applications, increasing the temperature on one side of the mold while maintaining the remaining portion of the mold at a cooler temperature causes the fibers on the heated side of the mold to fuse more than the fibers on the cooler side, thereby producing a gradient density effect. This gradient density effect can be enhanced by simultaneously applying pressure along with heat, as also discussed in the aforementioned prior applications. Taken to the extreme, a nonpermeable reinforcement or support can be made an integral part of the filter structure by applying sufficient heat and/or pressure to the portions of the filtering member which are to be made into the impermeable support structure.

According to the present invention, the inner surface of the convoluted portion (that is, the surface of the convoluted member which faces the other portion of the filter assembly) has a density less than the density of the opposite outer surface of the convoluted filter member. The inner surface of the convoluted member has a less open fiberous structure than the open batt-like structure of the other member, but has a high bulk fiber network on the inner convoluted surface. The outer surface of the convoluted member is as dense as the water laid filter paper used in existing filters and removes contaminates by sieving any contaminated particles from the fluid stream which make their way through the more open fiberous webs.

These and other advantages of the invention will become apparent from the following description, with reference to the accompanying drawing, in which FIG. 1 is a perspective view of a filter element made pursuant to the teachings of the present invention with the filter portions separated from oneanother;

Figure 1:
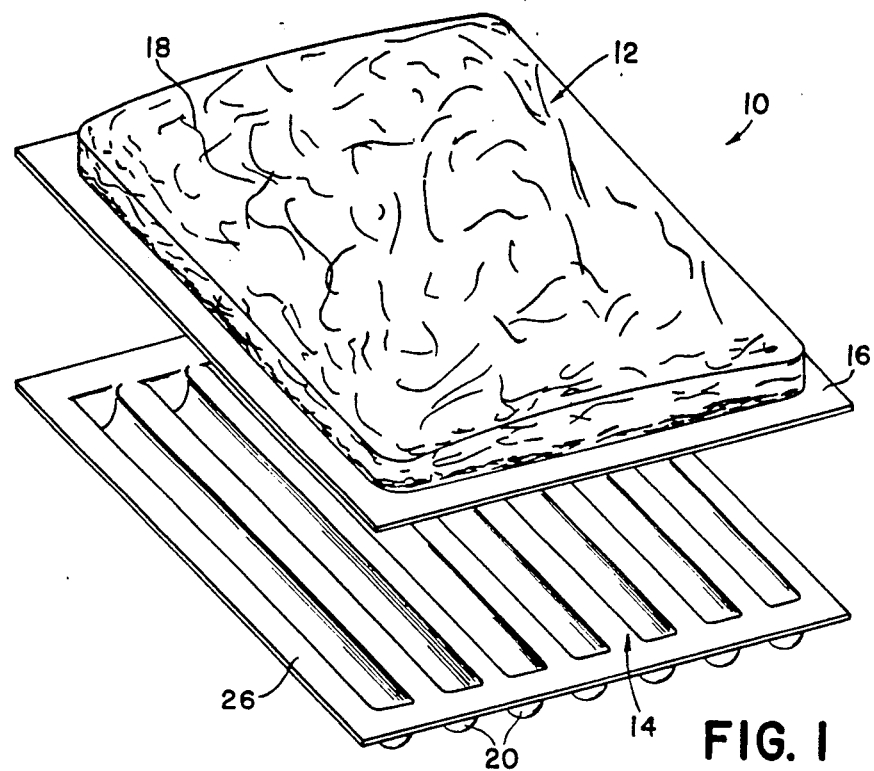
Figure 2:
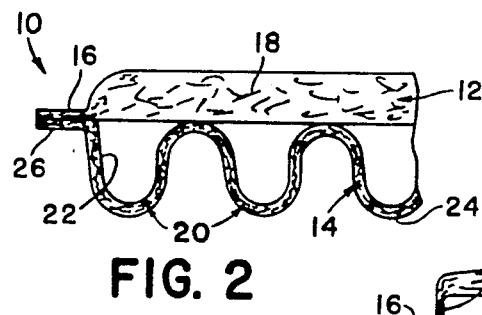
FIG. 2 is a cross-sectional view taken transversly through the pleats of the convoluted filter member and illustrating the filtering members after they have been assembled.

Referring now to the drawing, the fluid filter element generally indicated by the numeral 10 consists of a first filtering medium generally indicated by the numeral 12 and a second filtering medium generally indicated by the numeral 14. The first filtering medium 12 consists of a batt of nonwoven, randomly arrayed fibers which is prepared by the method described in both of the above-identified prior applications. The fibers in the batt are either a mixture of fibers containing a thermoplastic fiber (such as a polyvinyl) or is a mixture of fibers impregnated with a corsslinkable thermoplastic resin or a two stage thermosetting resin. The batt is cut to size and is placed in a ring-shaped heated mold as described in the above-identified U.S. patent application Ser. No. 765,783 now U.S. Pat. No. 4,636,231. The mold is heated to a predetermined temperature, somewhat above the stick point of the thermoplastic fiber blended in the batt or the resin impregnant. The mold is closed at a pressure of, for example, 1 ton while the ring-shaped die is heated to a temperature above the stick point of the thermoplastic material so that a marginal ridge portion 16 is formed which is stiffened and compressed, due to the heat and pressure applied to the marginal ridge portion 16, into a stiff, fluid impermeable support structure for a batt portion 18 of the first filtering medium 12 defined within the circumferential edge portion of 16. The batt portion 18, since it was never subjected to the heat and pressure to which the marginal edge portion 16 was subjected, retains its open characteristics so that air flow may pass through the batt portion in 18 with very little restriction. The fibers in the batt portion 18 form a web that is especially adapted to capture fine particles in the fluid stream passing through the batt. Since the particles are captured throughout the depth of the batt as the fluid flow flows through the batt, the batt 18 is known as a depth-type filtering medium. Because the fibers in the batt 18 are not fixed in position, larger particles can pass through the batt 18 with relative ease; however, the fiber network of the batt 18 is effective in reducing the momentum of the heavier particles passing through it. Ideally, the batt 18 is capable of capturing 70% or more of the fine particles in the fluid stream passing through the filter element 10.

The second filtering medium 14 is also made from a batt consisting of a nonwoven mixture of randomly arrayed fibers which is also made by the process discloseed in both of the aforementioned prior applications. The batt is cut into sections of appropriate size. A section is placed in a mold which is contoured in the proper shape to mold the second filtering media 14 into the shape illustrated. The second filtering media 14 is formed into a longitudinally extending array of generally parallel pleats 20. The pleats have an inner surface 22 which face the first filtering medium 12 and opposite outer surface 24. The second filtering medium 14 is formed with a circumferentially extending edge 26 which circumscribes the pleats 22 and is designed such that it registers with the marginal edge 16 when the filter element 10 is assembled as will be hereinafter described.

The batt from which the second filtering medium 14 is manufactured, as described above, either contains a mixture of fibers including thermoplastic fibers such as vinyl or is impregnated with a resin. Accordingly, when the medium 14 is molded, the fibers can be stiffened either through the action of the crosslinking thermoplastic resin or curing of the thermosetting resin or through the action of the thermoplastic fibers acting as a "glue" holding the fibers together. Accordingly, the filter element 10 is sufficiently stiff as to be self-supporting and does not require the screens and other support structure required by prior art panel filters.

It is also desireable that the second filtering medium 14 be made of gradient density, that is, that the density of the filtering medium increase in the direction of fluid flow though the medium, as described in the aforementioned prior application Ser. No. 765,782. The gradient in density is achieved by using male and female dies having the shapes of the pleats 20, and then heating the die which forms the sides 24 of the medium 14 to a temperature above the setting point of the resin impregnant and/or above the stick point of the thermoplastic fibers. The die which forms the side 22 of the second filtering medium 14 is maintained at substantially room termperature. As discussed in the aforementioned patent application Ser. No. 765,782 U.S. Pat. No. 4,661,132, the gradient density effect is produced by the differentially heated male and female molds and by applying pressure to the molds. Ideally, the temperature to which the outer side 24 is heated is sufficient that the passages between the fibers are made very small, so that the outer side 24 acts as a sieve or surface-type filtering media that is capable of removing almost all of the contaminate particles, thereby resulting in a filter with very high efficiency.

The surface 22 is a less open media than the batt 18, but still has a high bulk fiber network to be particularly adaptable for slowing and capturing particles. The surface 24 is as dense as the prior art water laid filter paper. Although the second filtering medium 14 is preferably made of gradient density, it is also within the scope of the present invention that the filtering medium 14 be of a uniform density. Uniform density can be achieved by maintaining both the male and female mold members at the same temperature.

The filtering medium 12 is assembled to the filtering medium 14 by bonding the marginal edge 16 to the circumferential edge 26. Bonding may be achieved by use of adhesive, or preferably by heating the edges 16 and 26 to a temperature at which the thermosetting resins and/or the thermoplastic fibers become tacky and stick to one another, thereby securing the edges 16, 26 together. If necessary, a sealant material may be applied over the marginal edges to thereby form a resilant seal to seal the filter when the filter is installed in the appropriate air cleaner housing (not shown). The sealant material can be applied at the time that the edges are secured together or at a later manufacturing step.

Figure 3:
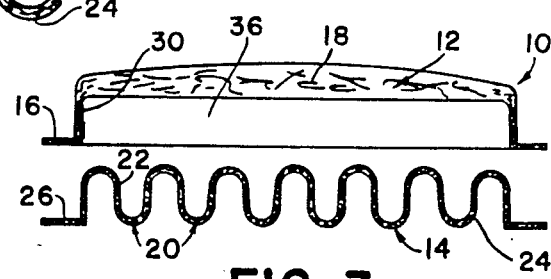
FIG. 3 is a view similar to FIG. 2 but illustrating a different embodiment of the invention.
Figure 4:
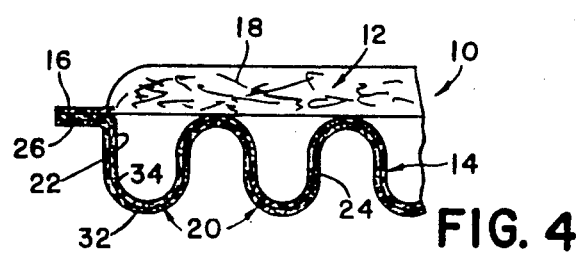
FIG. 4 is a view similar to FIG. 2 but illustrating still another embodiment of the invention.

Referring now to the alternate embodiments of FIGS. 3 and 4, the embodiment of FIG. 3 is substantially the same as the preferred embodiment, except that the first filtering medium 12 is formed with a ring-shaped die as illustrated in the aforementioned patent application Ser. No. 765,783 now U.S. Pat. No. 4,636,231 to thereby form a wall 30 which extends substantially parallel to the pleats 20 when the media 12 and 14 are assembled. Accordingly, the first filtering medium 12 defines a dish-shaped cavity 26 which receives the second filtering medium 14. Referring to the embodiment of FIG. 4, the gradient density effect may also be achieved by laminating the batt materials together before the second filtering medium 14 is formed. The permeability of the batt-like media is a function of several factors, such as the size of the fibers from which the batt is made, length of the fibers, etc. Accordingly, two different batts may be made of different fiber mixtures and then placed on top of one another when the batt section is placed in the mold to form the second filtering medium 14. In this way, even if the mold is heated to uniform temperature, a gradient density effect will be achieved, due to the fact that the second filtering medium 14 includes separate plies 32, 34 as illustrated in FIG. 4.

By way of example, but not by way of limitation, the following working examples of the invention are given:

EXAMPLE 1

A filter element is manufactured consisting of a first filter medium which comprises a 60/40 (by weight) mix of coarse (15 DPF) and fine (3 DPF) polyester fiber. The fiber mixture provides an open fiber fleece and is impregnated with a crosslinked polyvinyl acetate latex. The marginal edge portion of the batt is formed by placing the batt in a heated die which is heated to a temperature sufficient to set the acetate latex and is closed at a pressure of about 1 ton. The convoluted filtering portion is a mixture of 60% by weight of wood pulp, 15% by weight of comparable size synthetic fiber staples such as 1.5 or 3 DPF Viscose, and the remainder synthetic binder filter, such as a copolymer PVC-PVAC or a low melting polyester. The batt is placed between appropriate male and female dies, one of which is heated to a temperature just above the stick point of the binder fiber (250° F.), and the closing pressure of the press is regulated to several hundred psi, sufficient to form the filtering media without densifying it sufficiently to cause it to be fluid impermeable.

EXAMPLE 2

The first filtering media or batt portion is formed as described above. The convoluted portion of the filter element is made from a two-ply nonwoven, the outer ply (the ply facing away from the batt portion) being 85% by weight wood pulp, 15% b weight of comparable size fiber staple such as 1.5 or 3 DPF Viscose. The inner ply is 60% (by weight) self-supporting fiber with high surface area such as a 3 DPF polyester fiber blended with a copolymer PVC-PVAC. The composite is bonded with 15–20% (by weight) of a crosslinked polyvinyl acetate latex, although other thermoplastic binders could have been employed. The outer ply is usually two-thirds of the weight of the inner ply. The batt is formed as described above in Example 1.

We claim:

1. Fluid filter element comprising a first filtering medium and a second filtering medium, said first filtering medium comprising a first batt of nonwoven randomly arrayed fibers and containing a thermoplastic material, said first batt defining a main body portion and a substantially flat marginal edge portion circumscribing said main body portion, the thermoplastic material in said marginal edge portion stiffening the fibers in said marginal edge portion to provide a substantially fluid impermeable support and sealiang structure for said first batt, said second filter medium comprising a second batt of nonwoven randomly arrayed fibers and containing a thermoplastic material, said second batt having a main body portion in which the fibers in said main body portion of said second batt are stiffened by said thermoplastic material, said main body portion of said second batt being compressed and molded into a convoluted shape portion, said second filtering medium having a substantially flat circumferential edge portion extending from the main body portion of said second batt and containing fibers stiffened by said thermoplastic material to provide a substantially fluid impermeable support and sealing structure complementary to and registering with said marginal edge portion, said marginal edge portion being sealed to said circumferential edge portion.

2. Fluid filter as claimed in claim 1, wherein the fibers of said main body portion of said first batt are substantially uncompressed so that the main body portion of the first batt is relatively unrestrictive of fluid flow.

3. Fluid filter element as claimed in claim 1, wherein said convoluted shaped portion comprises an array of substantially parallel pleats.

4. Fluid filter element as claimed in claim 1, wherein at least some of the fibers in said marginal edge portion are fused with at least some of the fibers in the circumferential edge portion to join said media together.

5. Fluid filter element as claimed in claim 1, wherein said second filtering medium is a mixture of wood pulp fibers and synthetic fibers.

6. Fluid filter as claimed in claim 1, wherein the first filtering medium is a depth type medium and said second filtering medium includes a surface for sieving particle contaminates from the fluid being filtered.

7. Fluid filter element as claimed in claim 6, wherein said first filtering medium include synthetic fibers.

8. Fluid filter element as claimed in claim 1, wherein the density of said second filtering medium varies in the direction of fluid flow through the second filtering medium.

9. Fluid filter element as claimed in claim 8, wherein said second filtering medium has an inner surface facing said first filtering medium when the media are assembled and an opposiste outer surface, the fiber density at the outer surface being greater than that at the inner surface.

10. Fluid filter element as claimed in claim 8, wherein the second filtering medium is comprised of a more dense ply and a less dense ply.

* * * * *